(12) United States Patent
Rothschild et al.

(10) Patent No.: US 9,800,828 B1
(45) Date of Patent: Oct. 24, 2017

(54) METHOD FOR PRE-RENDERING VIDEO THUMBNAILS AT OTHER THAN MACROBLOCK BOUNDARIES

(71) Applicant: Cox Communications, Inc., Atlanta, GA (US)

(72) Inventors: Keith Alan Rothschild, Dunwoody, GA (US); Muhammad Asif Raza, McDonough, GA (US)

(73) Assignee: Cox Communications, Inc., Atlanta, GA (US)

( * ) Notice: Subject to any disclaimer, the term of this patent is extended or adjusted under 35 U.S.C. 154(b) by 145 days.

(21) Appl. No.: 14/214,331

(22) Filed: Mar. 14, 2014

Related U.S. Application Data

(60) Provisional application No. 61/788,255, filed on Mar. 15, 2013, provisional application No. 61/789,103, filed on Mar. 15, 2013, provisional application No. 61/788,494, filed on Mar. 15, 2013.

(51) Int. Cl.
*H04N 7/08* (2006.01)
*H04N 19/40* (2014.01)

(52) U.S. Cl.
CPC ..... *H04N 7/0806* (2013.01); *H04N 19/00472* (2013.01)

(58) Field of Classification Search
CPC ............. H04N 1/00442; H04N 2201/325
See application file for complete search history.

(56) References Cited

U.S. PATENT DOCUMENTS

| | | | |
|---|---|---|---|
| 5,978,043 A | 11/1999 | Blonstein | |
| 8,332,889 B2 | 12/2012 | Calzone | |
| 8,599,219 B2* | 12/2013 | Shechtman | G06T 3/4038 345/635 |
| 2003/0218682 A1* | 11/2003 | Lim | H04N 1/32101 348/333.11 |
| 2005/0028203 A1* | 2/2005 | Kim | H04N 5/44543 725/44 |

(Continued)

OTHER PUBLICATIONS

U.S. Appl. No. 14/214,275, filed Mar. 14, 2014 entitled "System and Method for Providing Network-Based Video Manipulation Resources to a Client Device".

(Continued)

*Primary Examiner* — Christopher Findley
(74) *Attorney, Agent, or Firm* — Merchant & Gould P.C.

(57) ABSTRACT

Pre-rendering video thumbnails at other than macroblock boundaries may be provided. A guide experience may be provided that incorporates thumbnail videos as part of a navigation experience that may be personalized per user input. "Personalized" mosaics and video-tiles may be provided as part of the guide such that a given mosaic has an integrated look and feel. An optional guide-view may be included as part of the navigation guide. Mosaics may be defined including a plurality of thumbnails which may be available for display on the client device. Per user request, the selected video may be retrieved, scaled to dimension other than the macroblock dimension, and be fitted within a macro block that has macroblock dimensions larger than the scaled dimensions of the scaled video and be displayed. A portion of the macroblock that does not include the scaled video may be masked.

15 Claims, 9 Drawing Sheets

(56) References Cited

U.S. PATENT DOCUMENTS

| | | | |
|---|---|---|---|
| 2006/0064716 A1* | 3/2006 | Sull | G06F 17/30793 |
| | | | 725/37 |
| 2007/0011702 A1* | 1/2007 | Vaysman | H04N 21/84 |
| | | | 725/45 |
| 2008/0066103 A1 | 3/2008 | Ellis | |
| 2008/0152297 A1* | 6/2008 | Ubillos | G11B 27/034 |
| | | | 386/333 |
| 2009/0083824 A1 | 3/2009 | McCarthy | |
| 2010/0074341 A1* | 3/2010 | Wan | H04N 19/46 |
| | | | 375/240.26 |
| 2010/0115554 A1* | 5/2010 | Drouet | H04N 5/44543 |
| | | | 725/41 |
| 2010/0123732 A1* | 5/2010 | Jenks | H04N 9/12 |
| | | | 345/592 |
| 2010/0171881 A1 | 7/2010 | Castellan | |
| 2011/0184950 A1* | 7/2011 | Skaff | G06F 17/30265 |
| | | | 707/737 |
| 2011/0216243 A1* | 9/2011 | Sekiguchi | H04N 21/234327 |
| | | | 348/581 |
| 2011/0314501 A1 | 12/2011 | Vaysman | |
| 2013/0036438 A1* | 2/2013 | Kutaragi | H04N 21/2743 |
| | | | 725/38 |
| 2013/0207999 A1* | 8/2013 | Hagiwara | G06F 17/30274 |
| | | | 345/619 |
| 2013/0272394 A1* | 10/2013 | Brockmann | G06T 9/00 |
| | | | 375/240.12 |
| 2014/0269930 A1* | 9/2014 | Robinson | H04N 21/2365 |
| | | | 375/240.24 |

OTHER PUBLICATIONS

U.S. Appl. No. 14/214,384, filed Mar. 14, 2014 entitled "Simultaneously Optimizing Transport Bandwidth and Client Device Performance".

Office Action mailed Feb. 4, 2015, in co-pending U.S. Appl. No. 14/214,384.

Office Action mailed Jul. 16, 2015 in U.S. Appl. No. 14/214,384; 18 pgs.

Office Action mailed Jan. 12, 2016 in U.S. Appl. No. 14/214,275; 17 pgs.

Final Office Action mailed Feb. 10, 2017 in U.S. Appl. No. 14/214,384; (20 pgs.).

Office Action mailed Mar. 8, 2017 in U.S. Appl. No. 14/214,275; (17 pgs.).

Final Office Action dated Aug. 17, 2017 in U.S. Appl. No. 14/214,275, 19 pages.

Office Action dated Aug. 25, 2017 in U.S. Appl. No. 14/214,384, 26 pages.

* cited by examiner

METHOD FOR PRE-RENDERING VIDEO THUMBNAILS AT OTHER THAN MACROBLOCK BOUNDARIES

CROSS-REFERENCE TO RELATED APPLICATIONS

The present application claims priority to U.S. Provisional Patent Application No. 61/788,255 titled "Method for Pre-Rendering Video Thumbnails at Other Than Macroblock Boundaries" filed Mar. 15, 2013, U.S. Provisional Patent Application No. 61/789,103 titled "System and Method for Providing Network-Based Video Manipulation Resources to a Client Device" filed Mar. 15, 2013, U.S. Provisional Patent Application No. 61/788,494 titled "Method for Simultaneously Optimizing Transport Bandwidth and Client Device Performance" filed Mar. 15, 2013, the disclosures of which are hereby incorporated by reference in their entireties.

BACKGROUND

Many television services providers offer "mosaic" channels. These mosaic channels display multiple thumbnails of video content on a single screen so that a user watching a particular mosaic, whether it be channel based or application, may be able to see multiple content, and also navigate to each individual thumbnail to listen to the audio related to the content. However, the mosaic channels that are available today are genre based and static, and may be defined at the market level with preset channels. Other than navigation, a user or subscriber watching the mosaic channel may not interact with mosaic channels; they may not be able to do any customization.

Users may appreciate a personalized mosaic space where they may have the ability to customize the mosaic channels such that they may set their preferred linear channels or network content. This may provide users with a personal experience with multiple video panes that they may use to watch content or for navigation purposes.

SUMMARY

Embodiments of the present invention solve the above and other problems by providing pre-rendering of video thumbnails at other than macroblock boundaries. According to embodiments, a guide experience incorporating thumbnail videos as part of a navigation experience may be provided. Some embodiments may include "personalized" mosaics and video-tiles as part of the guide such that the mosaic has an integrated look and feel experience. The guide experience may also include an optional guide-view as part of the navigation guide. Further, the guide experience may receive input from a user to personalize the mosaic for the user. This provides a highly integrated offering that should flow for a user.

A request may be received to manipulate a thumbnail within a mosaic comprising a video. The selected video may then be retrieved and scaled to a dimension other than the macroblock dimension. The scaled video may then be fitted within a macroblock that has macroblock dimensions larger than the dimensions of the scaled video. The macroblock including the scaled video may then be displayed. A portion of the macroblock that does not include the scaled video may be masked such that it may not include the scaled video with a graphic pane that overlays the macroblock.

According to embodiments, methods and systems are provided for pre-rendering video thumbnails at other than macroblock boundaries. The methods and systems include or provide for receiving a selection of a video, retrieving the video wherein the video is sized to macroblock dimensions, scaling the video to a scaled dimension other than the macroblock dimensions, and fitting the scaled video within a macroblock that has macroblock dimensions larger than the scaled dimensions of the scaled video. The scaled video may include a thumbnail tile displayed in a mosaic. The mosaic may include a plurality of thumbnail tiles for a plurality of scaled videos. Displaying the macroblock may include the scaled video. A portion of the macroblock may be masked. Masking the portion of the macroblock may include masking the portion that does not include the scaled video, or masking the portion of the macroblock that does not include the scaled video with a graphic pane that overlays the macroblock.

According to another embodiment, a method for pre-rendering video thumbnails at other than macroblock boundaries may include receiving a selection of a video, retrieving the video wherein the video is sized to macroblock dimensions, manipulating the video by scaling the video to a scaled dimension smaller than the macroblock dimensions, transcoding the manipulated video to fit the scaled video within a macroblock that has dimensions larger than the scaled dimensions of the scaled video, and transmitting the manipulated video to a client device for display.

The details of one or more embodiments are set forth in the accompanying drawings and description set out below. Other features and advantages will be apparent from a reading of the following detail description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout the several figures.

DETAILED DESCRIPTION

As briefly described above, embodiments of the present invention are directed to pre-rendering of video thumbnails at other than macroblock boundaries. As summarized above, a request may be received to manipulate a thumbnail within a mosaic comprising a video. The selected video may then be retrieved and scaled to a dimension other than the macroblock dimension. The scaled video may then be fitted within a macroblock that has macroblock dimensions larger than the dimensions of the scaled video. The macroblock including the scaled video may then be displayed. A portion of the macroblock that does not include the scaled video may be masked such that it may not include the scaled video with a graphic pane that overlays the macroblock.

According to embodiments, network-based video manipulation resources may be utilized to receive input from a user to personalize a user's guide experience. For example, a set-top box 905 (illustrated and described below with reference to FIG. 9) utilizes an application that is configured to access a network resource, which has permission to access the video stream and manipulate the videos. The set-top box may be able to receive and incorporate the manipulated videos into thumbnail videos displayed in a mosaic guide that may provide the navigation experience for the set-top box. Further, some embodiments may include "personalized" mosaics and video-tiles as part of the guide such that the mosaic provides an integrated and personalized look and feel experience.

Figure 1:
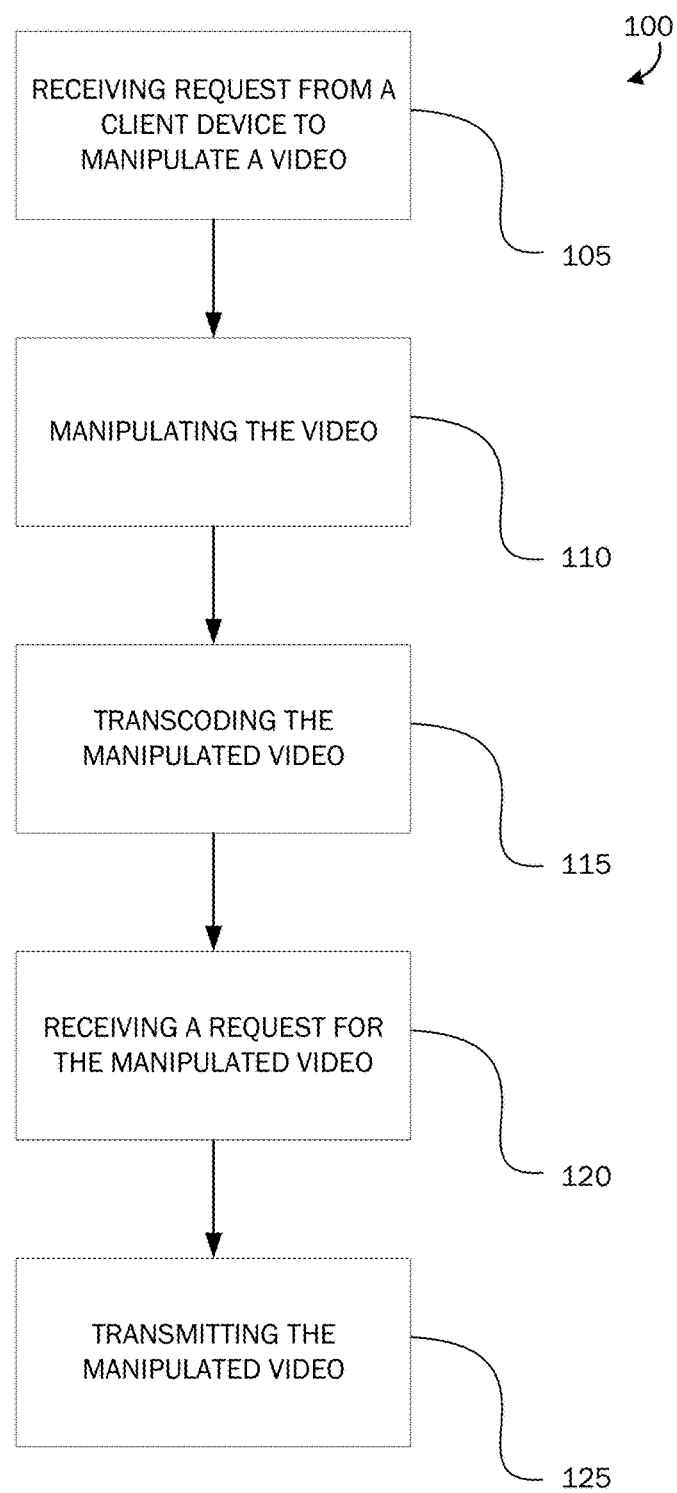
FIG. 1 is a flowchart illustrating one embodiment of a method for providing network-based video manipulation resources to a client device.

FIG. 1 is flowchart illustrating one embodiment of a method 100 for providing network-based video manipulation resources to a client device.

The method includes the operation 105 of receiving a request from a client device to manipulate a video. In one embodiment, the set-top box 905 may essentially tell the composition component to replace a video with another video. In another embodiment, the set-top box may direct the composition component to replace a video with another video. The set-top box may also indicate whether the video should include the active audio associated with the video. Further, the set-top box may tell the composition component to remove a video from the guide listing, to rearrange the remaining videos, and to add a new video at the end.

At operation 110, the network resource may create a manipulated video.

At operation 115, the network resource may transcode the manipulated video. In one embodiment, all of the video streams may come into a transcoder. The transcoder may transcode the video streams and communicate the video streams to the composition component to consume.

At operation 120, the network resource may receive a request for the manipulated video from the client device. In one embodiment, on the set top box side, when the set top box 905 launches the guide, e.g., when the user switches to the guide view that displays videos, the set-top box may communicate to the network resource that a video stream with selected sources in the following locations is required.

At operation 125, the network resource may transmit the manipulated video to the client device. When the resources are available, the resources may be communicated to the set-top box via the network. This may occur concurrently or within a short time thereafter. For example, the network resource may go to the network to obtain the different tiles and the different transcoded video. The network resource may then put the transcoded videos in the identified locations and may stream the data to an IP-based location that corresponds to the encryption and network resources to which it has been allocated, at which point in time, the set top box may have tuned to the IP-based location. The set-top box 905 will detect the stream, receive the stream, and will overlay all of the graphics on to the stream. In one embodiment, the identified locations for the stream are a static set of coordinates. In another embodiment, the transcoded resource may be allocated and located at a customized location. In one embodiment, the set-top box may display an animation during the back end processing. It should be noted that the embodiment may involve the integration of two different panes.

Further, the same process may be performed for displaying the main video. For example, if the set-top box is displaying a live video, it may be displayed through one of the tiles of the mosaic. If the set-top box switches views in the guide there may be several different options available. For example, the set-top box may display a scaled live video while displaying the listing guide. In another example, the set-top box may maintain the scaled live video and move to a list view. In this situation, the list view may be moved and upon channeling down, the set-top box may change the background to continue to display the video in the background as the guide is being displayed as a list instead of tiles.

The set-top box 905 may either go back to the way it would have been before the mosaics had been invoked, or the set-top box may keep the mosaics in the background and may switch back and keep the same screen by keeping the same pointer in the set location. In other words, if the set-top box is two pages down in the list of recommendations, the set-top box may be able to retain its location in the list while seamlessly switching views.

Figure 2:
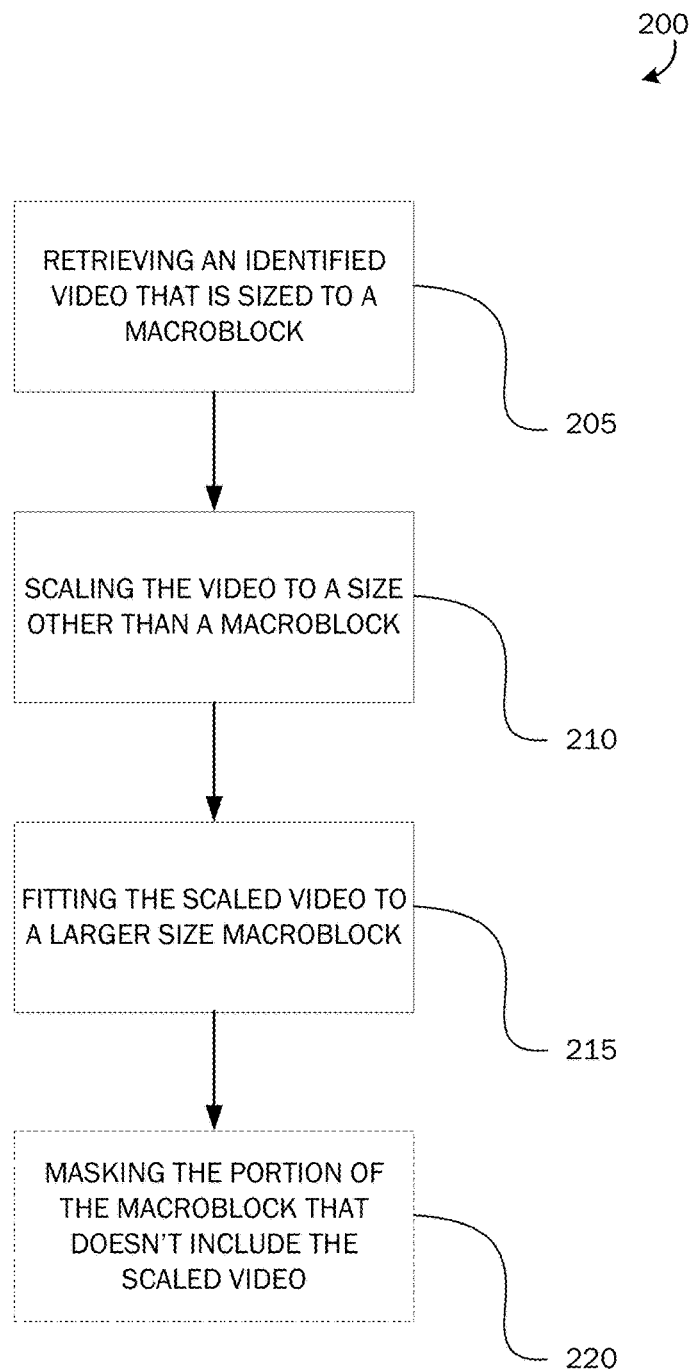
FIG. 2 is a flowchart illustrating one embodiment of a method for pre-rendering video thumbnails at a size other than the macroblock boundaries.

FIG. 2 is flowchart illustrating one embodiment of a method 200 for pre-rendering video thumbnails at a size other than the macroblock boundaries. Because the transition between the mosaic and listing may be an integrated part of the guide, transitioning between different displays may present formatting problems. It should also be recognized that different systems may be involved in generation of the guide and mosaics, edges may be displayed slightly different. For example, during the switching between the guide views, using 16 by 16 macroblock boundaries would result in slight shifting, but it may be perceivable to the user that it shifted. Accordingly, some embodiments, the guide and mosaic tiles may need the thumbnail videos to be arranged in non-macroblock size videos because the thumbnail video tiles dynamically change size.

In one embodiment, the system may communicate the target thumbnail size, the overall size of the thumbnail when extended to cover all partial macroblocks, the off-set area, and using concepts from perceptual masking, possibly even further optimizing the compression on those partial macroblocks.

At operation 205, the method may retrieve an identified MPEG video. MPEG video includes a plurality of macroblocks which are each generally 16×16 pixels. According to embodiments, MPEG-2/H.262 standards support 16×16 macro-block boundaries, and support for 8×8, 8×16, and 16×8 macro-block boundary sizes according to MPEG-4/H.264 standards may be provided.

At operation 210, the method may scale the video to a size other than a multiple of a whole macroblock. In one embodiment, the video may be scaled to a certain size, which will fit within a larger set of macroblocks. For example, in one embodiment, the transcoder may transcode the video down to a certain size. For example, the transcoder may be reduced to the target thumbnail size.

At operation 215, the method may fit the scaled video to a larger whole macroblock. As disclosed above, the transcoder may transcode the video down to a certain size. However, the video also fits within a larger set of macroblocks boundaries. In other words, the scaled video may be smaller than 16 by 16 macroblock boundaries, but, in order to transfer the scaled video, the video still may have to be on the 16 by 16 macroblock boundaries.

At the optional operation 220, the method may mask the portion of the macroblock that does not include the scaled video. In one embodiment, the method may utilize perceptual masking such that it does not matter what may be in a particular area, because the area will be covered by graphics from the guide. Further, the area may allow the service provider to optimize the amount of bandwidth used by reducing the extraneous content or other material used to create the macroblocks. In one embodiment, perceptual masking may allow the method to utilize two different areas of the macroblock. Specifically, the system may soften the unimportant area and balance the effects of softening the unimportant area upon an area with the scaled video to minimize the overall video quality.

Figure 3:
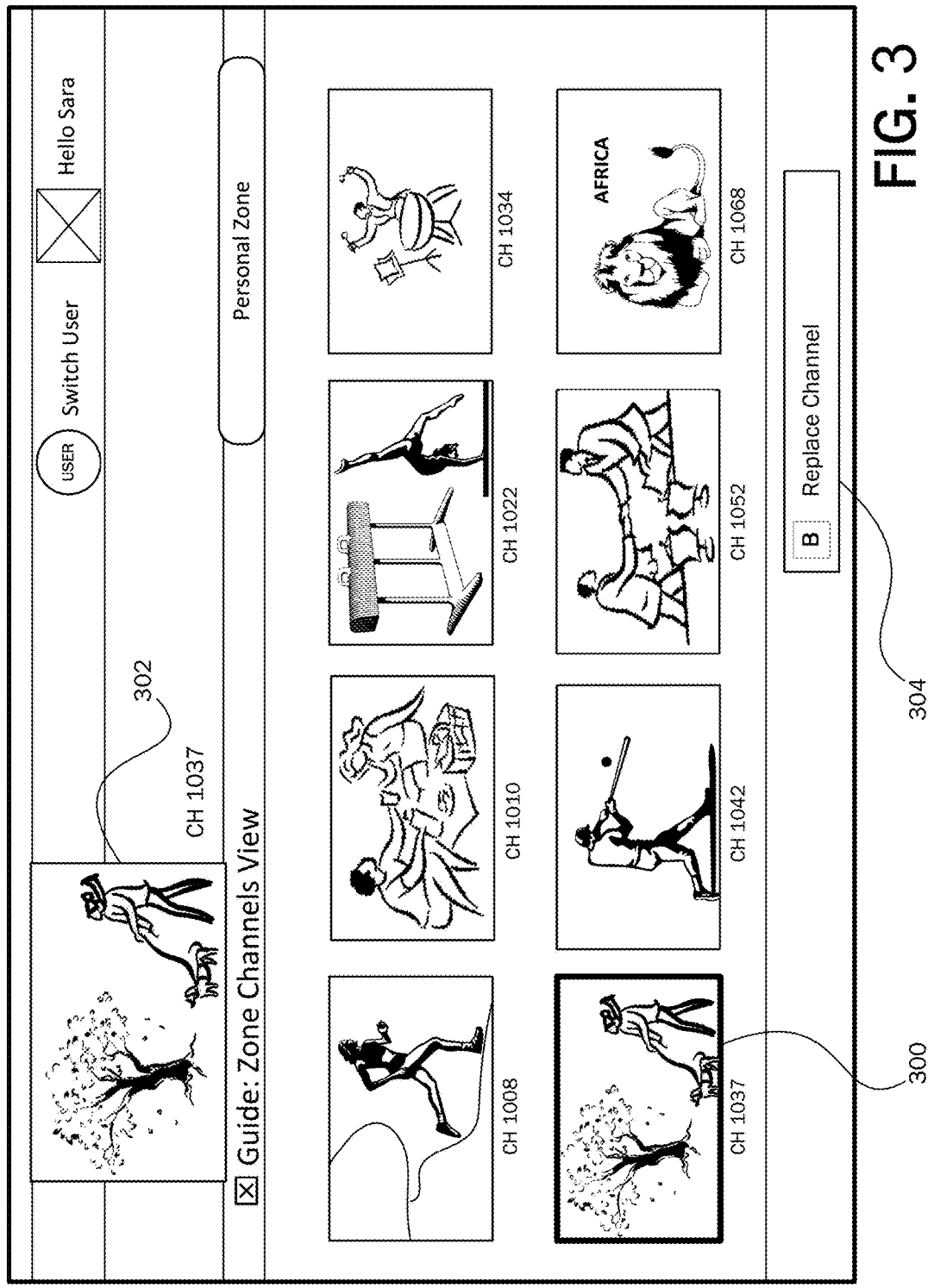
FIG. 3 is an example embodiment of a programming guide that incorporates thumbnail videos as part of the navigation experience.

FIG. 3 is an example embodiment of a programming guide that incorporates thumbnail videos as part of the navigation experience.

Figure 4:
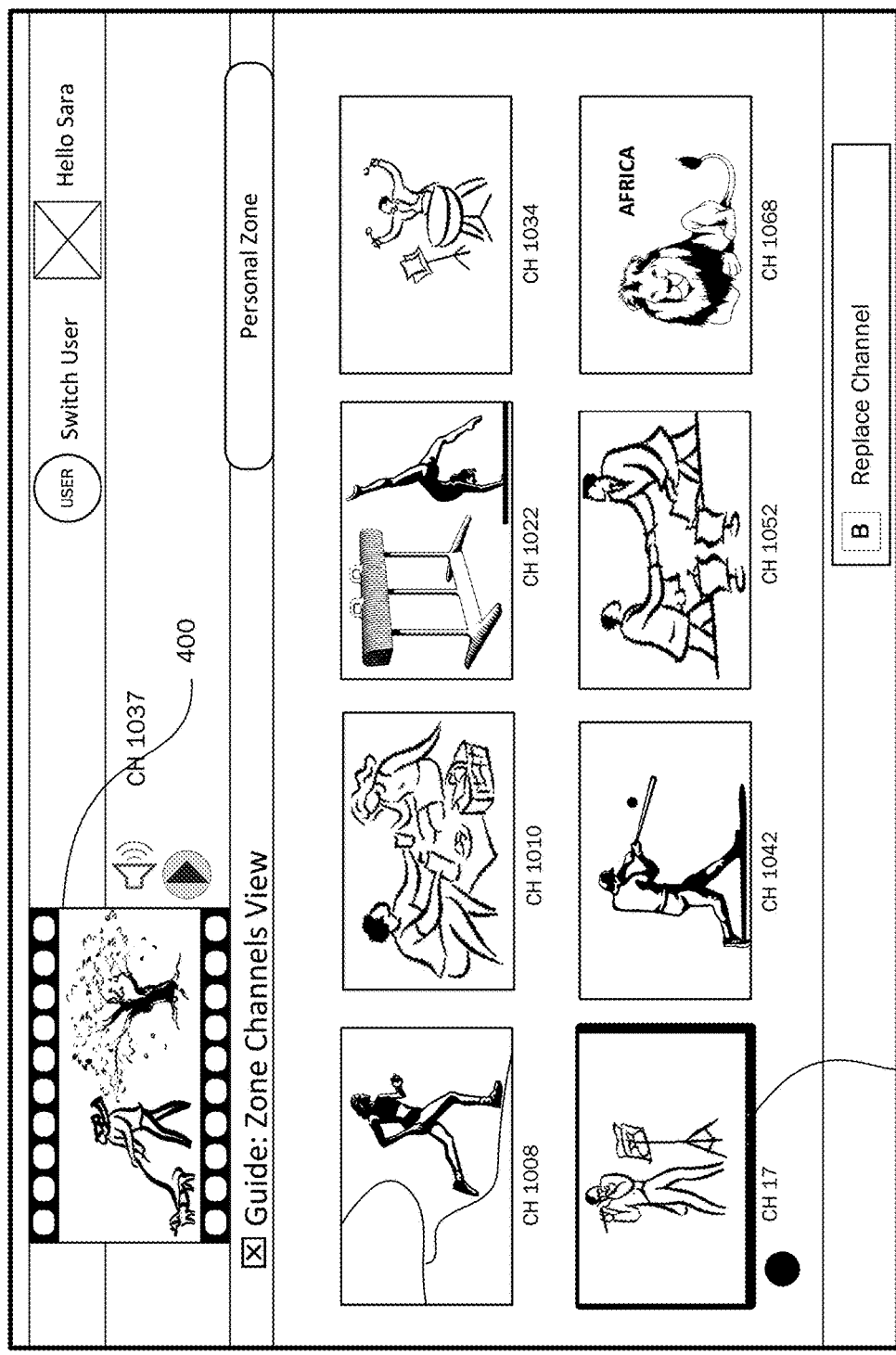
FIG. 4 is an example embodiment of a programming guide that incorporates thumbnail videos as part of the navigation experience.

In the illustrated embodiment, the guide is a mosaic including a plurality of tiles. Further, one of the tiles 300 in the mosaic is selected such that the representation is displayed in the currently viewed tile 302. As depicted in FIG. 4, a video stream and audio may then be displayed in the currently viewed tile. The selected tile may also be replaced. For example, after selecting the tile, the user may be given the option 304 to replace the channel. For demonstrative purposes, the user may select to replace channel 1037 with channel 17.

Furthermore, FIG. 3 illustrates one embodiment of the user interface including a plurality of mosaic tiles. Specifically, the user interface guide may include a plurality of scaled video displayed as the mosaic tiles as described above with respect to FIG. 2. Further, each scaled video is being streamed and may include two panes in the set-top box, including a video pane and a graphics pane. The graphics pane may overlay on top of the video in the video pane. As discussed above, with respect to perceptual masking, the graphics pane is essentially hiding a portion of the video pane. In one embodiment, switching between the regular guide view and the mosaics guide view may include a high penalty in terms of processing time. The high processing time may present a problem to keep the display and the scaled video active at the same time.

FIG. 4 is an example embodiment of a programming guide that incorporates thumbnail videos as part of the navigation experience, which implements the actions described above. Specifically, a video stream and audio may then be displayed in the currently viewed tile 400. Further, the bottom left tile 402 has been changed to reflect the content of channel 17.

Figure 5:
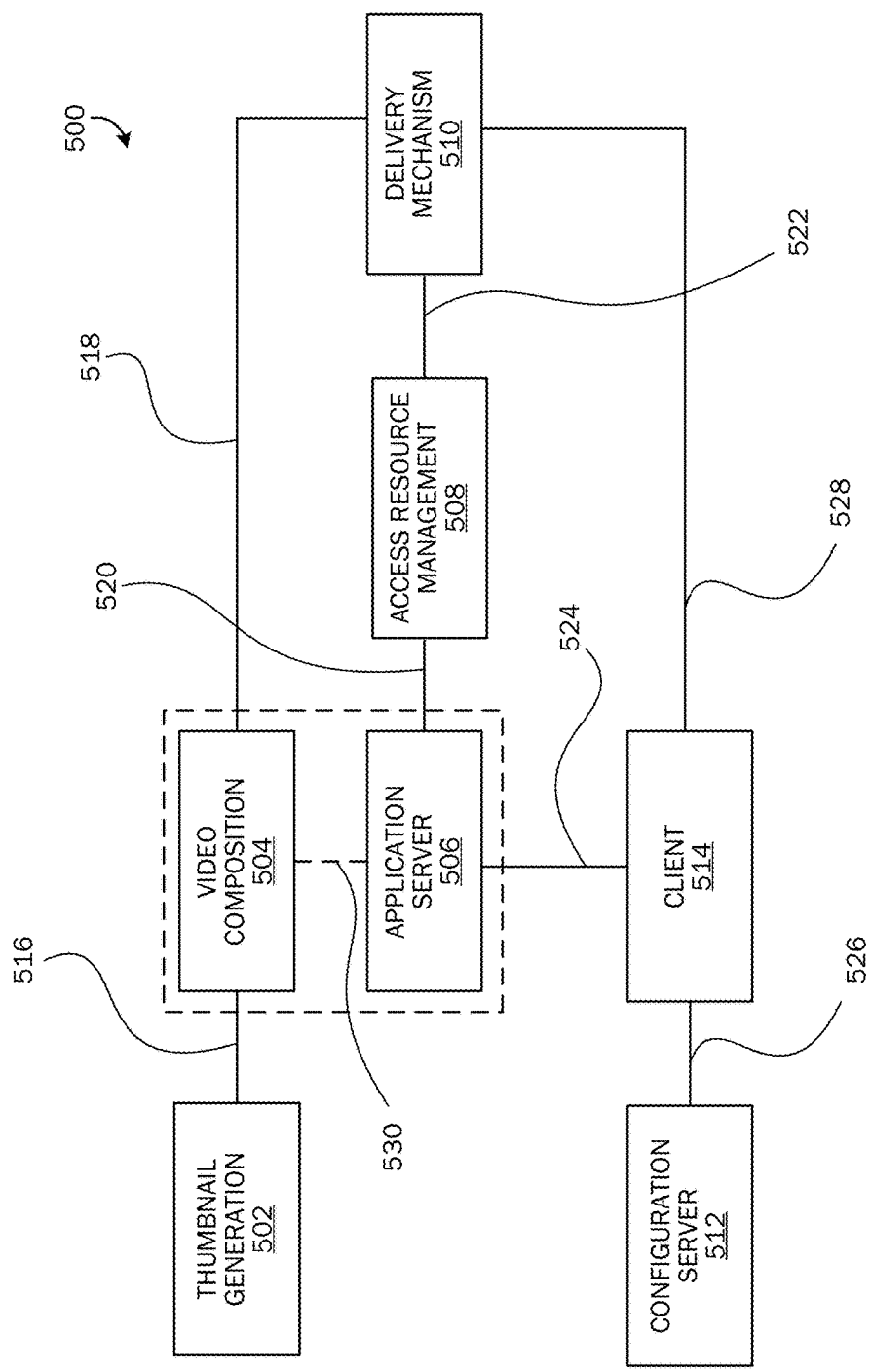
FIG. 5 is a block diagram of an exemplary system for providing network-based video manipulation resources to a client device.

FIG. 5 is a block diagram of an exemplary system 500 for providing network-based video manipulation resources to a client device. In the illustrated embodiment, the simplified block diagram is divided into multiple blocks, namely a thumbnail generation block 502, video composition block 504, application server block 506, access resource management block 508, delivery mechanism block 510, configuration server block 512, and the client block 514. It should also be noted that, in some embodiments, the video composition block 504 and application server block 506 may reside in the same system/component. Further, the simplified block diagram includes seven interfaces between the blocks, which allows for communication there between. Specifically, in the illustrated embodiment, the thumbnail generation block 502 and video composition block 504 communicate via a first interface 516, the video composition block 504 and delivery mechanism block 510 communicate via a second interface 518, the application server block 506 and access resource management block 508 communicate via a third interface 520, the access resource management block 508 and delivery mechanism block 510 communicate via a fourth interface 522, the application server block 506 and client block 514 communicate via a fifth interface 524, the delivery mechanism block 510 and access resource manager block 508 communicates via a seventh interface 528, the configuration server block 512 and client block 514 communicate via a sixth interface 526, and the video composition and application server communicate via an eighth interface 530. However, if the video composition block 504 and application server block 506 reside in the same system/component, as noted above, the seventh interface 528 may be a private interface if the blocks are implemented in a single component.

In one embodiment, the system may operate to provide network-based video manipulation resources to a client device, wherein the video composition component may be an external resource managed by the client through the application server. The video composition may use reduced resolution versions of live feeds from the thumbnail generation component in the creation of tile-based video mosaics. The client may interface with the configuration server block 512 for application configuration and option information. Composed video may be delivered to the client using the delivery mechanism block 510 as assigned by the access resource management 508 component.

Referring now to FIG. 5, the thumbnail generation block 502 is illustrated in association with the system for providing network-based video manipulation and includes hardware and software functionality operative to generate thumbnails of content provided by the service provider. For example, in one embodiment, the thumbnail generation block 502 may be a transcoder. As should be appreciated, the thumbnail generation block 502 may also dictate characteristics relating to the thumbnail.

Generally, the target size of the thumbnails is determined by the design of the user interface for the mosaic. For example, in one embodiment, the target size of the thumbnails may align with 16×16 macro-block boundaries consistent with MPEG-2/H.262 standards. In another example, the ability to support 8×8, 8×16, and 16×8 macro-block sizes for MPEG-4/H.264 standards may be provided.

However, neither 16×9 nor 4×3 thumbnails align well with 16×16 macro-block boundaries. Thumbnails of specific sizes may be needed. However, in certain embodiments, the thumbnails may be generated within macro-block boundaries and rely on the application to block-out part of the macro-block and/or some of the video could be trimmed to fit better into the macro-block boundary. For example, the thumbnail video may be masked down from 16:12/4:3. In another embodiment, the thumbnail video may be trimmed down to 16:8/2:1.

The thumbnail generation block 502 and the video composition block 504 communicate via an interface. In one embodiment, the thumbnail generation and video composition component may perform IP-based communication. For example, the thumbnails may be transmitted as live UDP-multicast streams and will support IGMPv3 SSM. Furthermore, in one embodiment, the thumbnails are MPEG-4 encoded and utilize a MPEG-2 transport stream encapsulation, and will have been scaled down to target resolutions. If the content is transmitted over the service provider's backbone, some level of conditional access or link-protection may be supported.

The video composition block 504 is illustrated in association with the system for providing network-based video manipulation. The video composition block 504 may include hardware and software functionality operative to generate a live-streaming content stream containing multiple components. Further, the video composition block 504 may support standard-definition and high-definition outputs. For example, in one embodiment, the supported standard-definition and high-definition outputs may include MPEG-2/H.262 and MPEG-4/H.264.

The video composition block 504 generates a live-streaming content stream for the graphics panes of the target devices. For example, in one embodiment, the video composition block 504 may be configured to generate the live-streaming content stream for square-resolution graphic panes, including 640×480 for standard-definition (40×30 macroblocks), 1280×720 (80×45 macro-blocks) and/or 1920×1080 for high-definition (120×67.5 macroblocks).

Further, the quality of the video may also be dependent upon the percentage of screen that can contain video at given bit-rates, inclusive of a single audio, encryption, and other overhead. Multiple constraints may be specified, including output resolution, GOP characteristics, and frame-rate. The cumulative bit-rates may include one or more of a range of values such as bit-rates of 2.50 Mbps, 3.75 Mbps, 5.00 Mbps, 6.25 Mbps, 7.50 Mbps, and so forth. Other considerations for selecting of the video quality may be influenced by implications to the shared HFC access resources being utilized, especially any considerations relating to the access-resource-management system selected.

The video composition generation block and the application server block 506 communicate via an interface. As discussed above, the video composition block 504 and application server block 506 may reside in the same system/component that may be an internal interface, and may be proprietary to the vendor if the application server and video composition component are included in the same component.

The application server block 506 and the video composition block 504 communicate via an interface. For example, the composed video may be transmitted to the delivery mechanism over UDP unicast or multicast as directed by the access resource manager. This video may be at the target resolution (full screen), and is intended to be MPEG-4 encoded over an MPEG-2 transport stream. Further, the PID structure may be compliant with the standards used for VOD SPTS streams.

The application server block 506 is illustrated in association with the system for providing network-based video manipulation. Generally, the application server is the session-manager and interfaces with the client (g), with the access resource manager (d), and with the video composition system (b). The application server block 506 and the access resource management block 508 communicate via an interface. In one embodiment, the interface should leverage the open specifications used between the session manager and the resource manager. The application server block 506 and the client block 514 communicate via another interface. In one embodiment, the client may be able to communicate instructions to the application server for the creation of the composite video, including all relevant information such as active audio, and may provide the client with tuning/content acquisition information.

The access resource management block 508 is illustrated in association with the system for providing network-based video manipulation and may include hardware and software functionality operative to manage access to the resources. In one embodiment, the session and resource management may be separated from one another. The access resource manager block and the delivery mechanism block 510 communicate via an interface. In one embodiment. Further, in some embodiments, it may be recognized that within a HFC access network, maintaining separate blocks of QAMs for different applications minimizes opportunities for efficiencies. For example, potential efficiencies may arise due to usage patterns between service groups with some potential for time-of-day based reconfiguration. Additional information relating to the access resource management block will be addressed, in more detail below, with respect to FIG. 6.

The delivery mechanism block 510 is illustrated in association with the system for providing network-based video manipulation and includes hardware and software functionality operative to transmit the video content. In one embodiment, the delivery mechanism block 510 is configured to provide encryption and QAM modulation. The thumbnail generation block 502 and the video composition block 504 may communicate via an interface. In one embodiment, the interface may leverage existing specifications on transmission of unicast streams to a client, such as those utilized within the VOD application space. In one embodiment, the delivery mechanism block 510 may closely resemble the VOD delivery mechanism.

However, some embodiments of the delivery mechanism block 510 may not have sufficient resources for transmission and, thus, may require additional resources. The sufficiency of the resources may vary from one operating-unit to another or even within any given operating-unit depending on unique characteristics. These additional resources may include selection of VOD QAMs over a dedicated bank of QAMs, sharing with SDV QAMs, or delivery in-band over DOCSIS. As should be appreciated, the distribution with SDV QAMs was considered as part of the evaluation of the access-resource manager segment, and is discussed below with respect to FIG. 6. Generally, distribution with SDV QAMs may provide separation of session and resource management interfaces in the Adrenalin 6.x platform, a session-based encryption workflow, and a distribution scheme alignment (VOD and Personalized Mosaics are QAM-unicast, SDV is QAM-multicast). With respect to delivery in-band over DOCSIS, the delivery mechanism block 510 may deliver to QAM-based IP-clients and set-top boxes with embedded DOCSIS capability.

The client block 514 is illustrated in association with the system for providing network-based video manipulation and may include hardware and software functionality operative to utilize personalized mosaics. Generally, the client may utilize the personalized mosaics as an external resource for manipulating streaming videos in a manner not capable within the client due to client-side limitations, e.g., processing, ability to receive, potential bandwidth constraints.

For example, the client may retrieve any configuration information from the configuration server block 512 and request the application server provide a frequency and MPEG-number where it can receive a video stream based on a set of specifications provided. The client may communicate information with the application server to select the included/active audio and/or to change content positioning or content. The client may render the graphics to ensure that transition graphics remain consistent and that the quality of graphics remains high while minimizing the bandwidth required for the live stream.

The configuration server block 512 and the client block 514 communicate via an interface. In one embodiment, the interface may leverage existing interfaces where possible, including any in-flight modifications, and may minimize or eliminate project-specific modifications. For example, the client may need to know which services are available for inclusion as a video tile including entitlements, data to identify if a channel has a video tile available, and information about versions of the video tiles that are available.

The configuration server block 512 is illustrated in association with the system for providing network-based video manipulation and may include hardware and software functionality operative to provide customization options. In one embodiment, the configuration server block 512 may store and provide the client with customization information. For example, in one embodiment, mosaics may be generated using information that originates in the network, which may be provided to the client through the configuration server 512. In another embodiment, the customization information may include user defined customized mosaics that may be stored locally and on the configuration server 512. In either situation, users that utilize multiple types of devices may access their customized mosaics on any of their devices.

Figure 6:
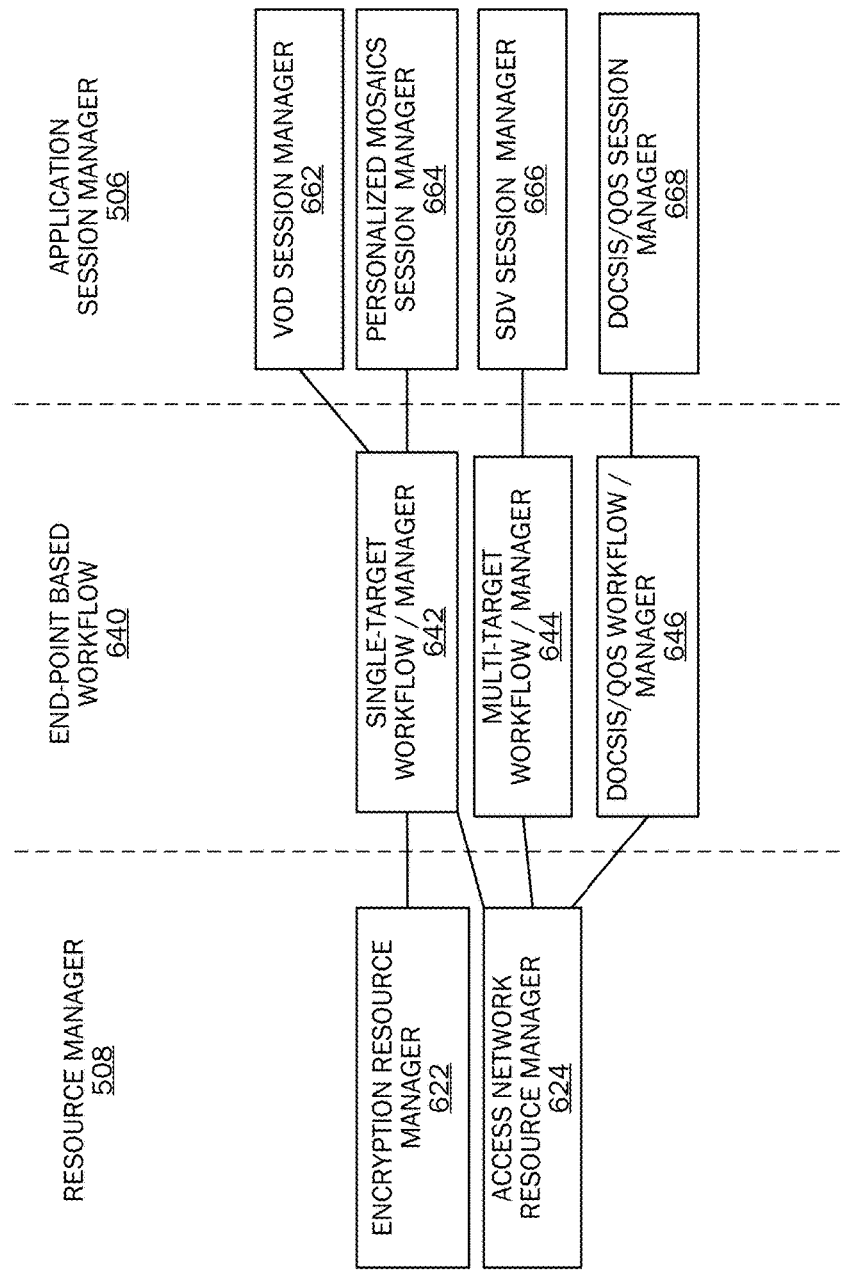
FIG. 6 illustrates a block diagram relating to the functionality and relationships between the resource manager and the application session manager.

FIG. 6 illustrates a block diagram 600 relating to the functionality and relationships between the resource manager 508 and the application session manager 506. Specifically, FIG. 6 illustrates one embodiment where the session and resource management may be separated from one another. Accordingly, the block diagram does not have a global access-network resource-manager component. Instead, the resource manager 508 may only have control over the dedicated pool identified for the application, including VOD and Personalized Mosaics. The resource manager 508 may fulfill more of the workflow aspect of the desired end-state, ensuring all the appropriate resources are allocated in an integrative manner (encryption and QAM/unicast) Furthermore, in order to implement encryption and access to the HFC access network (QAM/unicast), the personalized mosaics session manager may be targeted to interface with the resource manager 508 to share encryption and HFC access network resources, and may be expected to do so in the same manner as the application session manager 506.

Generally, the diagram is separated into three types of categories, including a resource manager 508, an end-point based workflow 640, and an application session manager 506. The illustrated embodiment of the resource manager 508 includes an encryption resource manager 622 and an access network resource manager 624. Further, the resource managers have been identified within SDV session manager and VOD session manager. In one embodiment, the resource manager 508 may include a Switched Digital Video (SDV) that typically relies on bulk network-encryption of content and manages multiple recipients of the same content (QAM/multicast), a Video On-Demand that typically relies on session-based encryption controlled by the resource manager 508 and manages content that is targeted to a single recipient (QAM/unicast), or other resource manager. The illustrated embodiment of the end-point based workflow 640 may include a single-target workflow/manager 642, a multi-target workflow/manager 644, and a DOCSIS/QOS workflow/manager 646. The illustrated embodiment of the application session manager 506 may include a VOD session manager 662, a personalized mosaics session manager 664, an SDV session manager 666, and a DOCSIS/QOS session manager 668.

It should also be recognized that other configurations and embodiments may be utilized for the resource management function, the work-flow and integrated with resource-specific managers with a broader range of control over a specific resource class.

Figure 7:
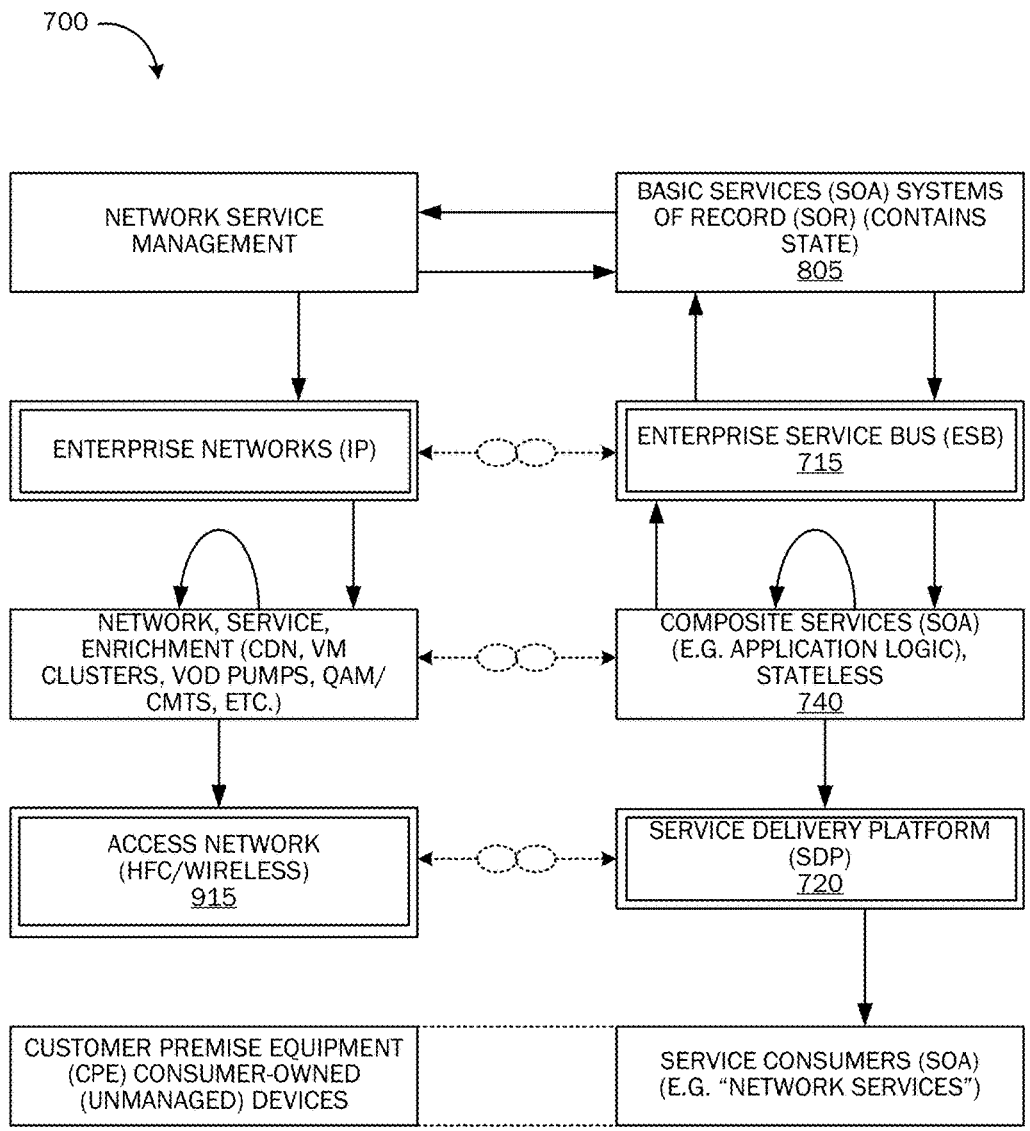
FIGS. 7 and 8 illustrate example architecture for a system providing network-based video manipulation resources to a client device.
Figure 8:
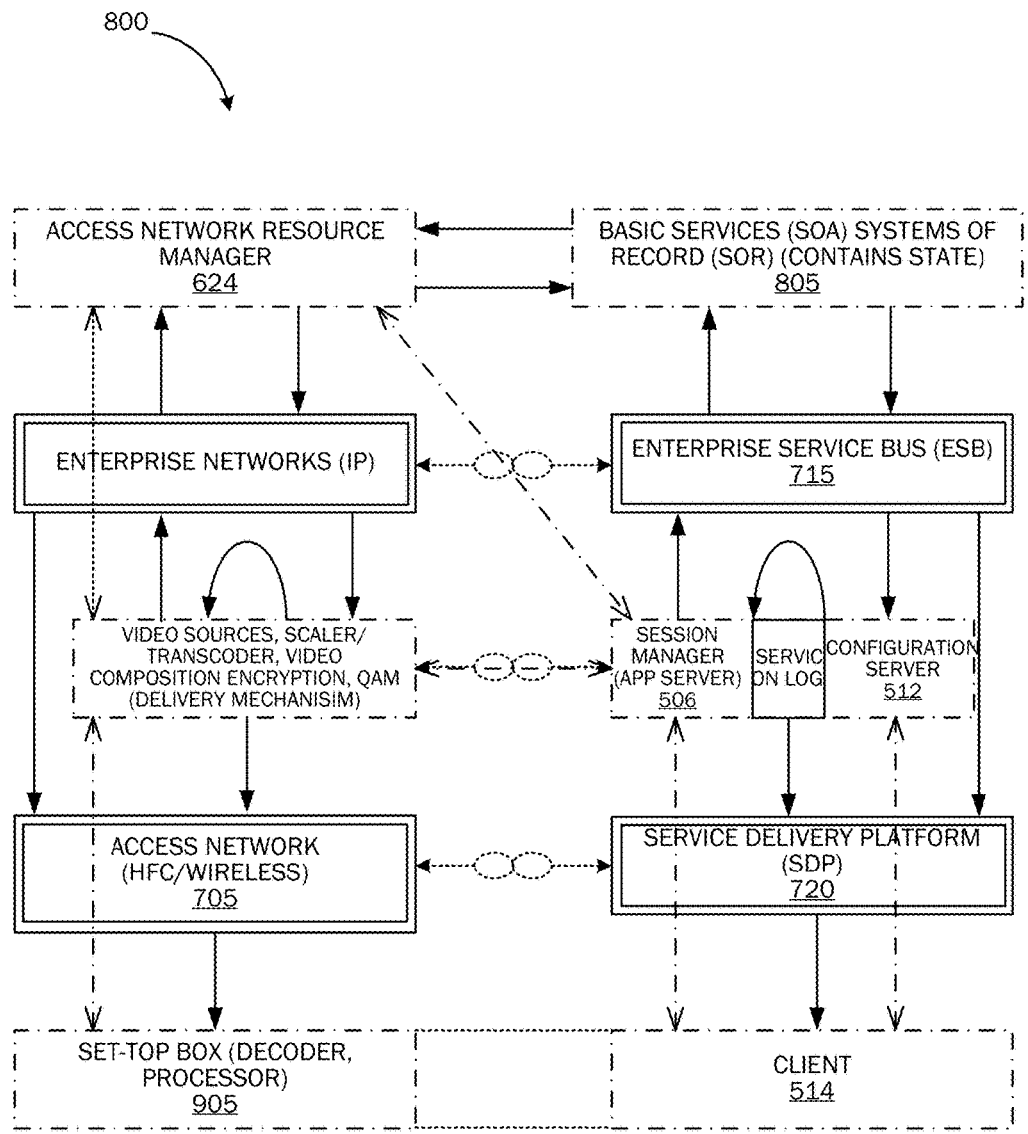

FIGS. 7 and 8 illustrate example architecture 700, 800 for a system providing network-based video manipulation resources to a client device. Specifically, FIG. 7 depicts a system architecture that may have components realigned to provide the architecture functionality as displayed in FIG. 8. The redesign and coupling of architectural components is broadly recognized as being problematic as it may have complicated development and slowed deployment of new products and features. Accordingly, the system architecture illustrated in FIG. 8 creates an integrated platform by utilizing the existing components illustrated in FIG. 7 to create component segments that may be developed and deployed in parallel with few critical interdependencies.

In the illustrated embodiment, the service delivery platform (SDP) 720 and enterprise service bus (ESB) 715 are integration platforms that include a set of functionality that are core to a well-defined, critical to ensuring the integration function, and standard across a broad range of applications. The SDP 720 acts as an integration point separating the service provider's trusted network and an untrusted network. Further, some embodiments of SDP 720 may be mostly SOA-compliant. In addition to the SDP 720, the Enterprise Service Bus (ESB) 715 may also act as an integration component. For example, the ESB 715 may provide some of the same functions as the SDP 720, especially those related to integration functionality (e.g. abstraction/normalization). In one embodiment, the northbound-interface of the ESB 715 may generally maintain state while the southbound-interface may ideally be stateless (or maintain ephemeral states). Everything southbound of the ESB 715 in the application service stack is expected to utilize a representational state transfer (RESTful) interface similar to most web-service interfaces. The ESB 715 may provide the interfaces for service that do not natively supply such an interface. The ESB 715 may also provide an interface to access data-stores (databases, flat-files, proprietary storage etc.), basic services (SOA), or systems of record (SOR) 805. The ESB 715 may be used to abstract interfaces into these systems for consumption by composite services 740.

Figure 9:
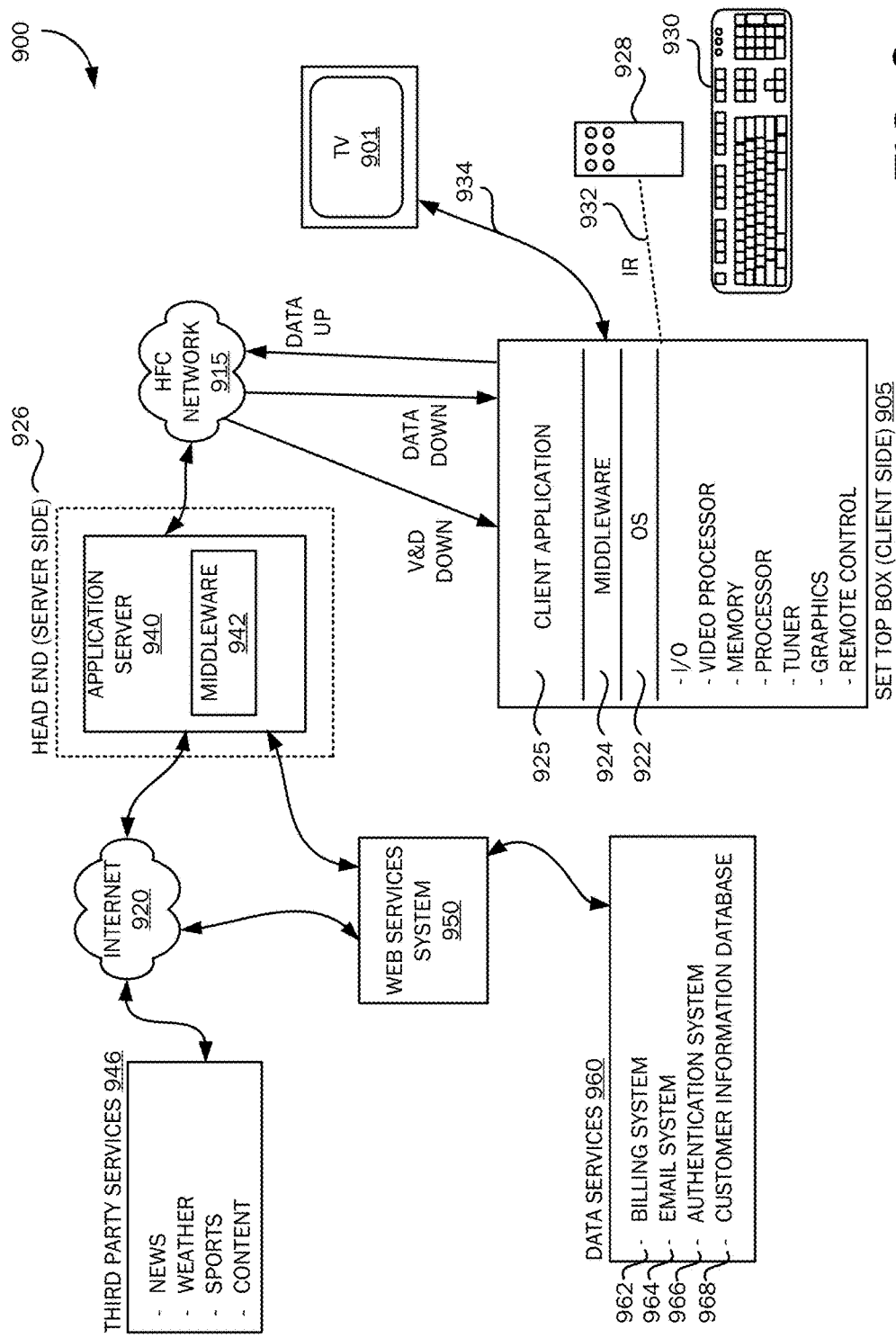
FIG. 9 is a simplified block diagram illustrating a cable television services system architecture providing an operating environment according to an embodiment.

FIG. 9 is a simplified block diagram illustrating a cable television services system 900 (hereafter referred to as "CATV") architecture providing an operating environment according to an embodiment. As can be appreciated, a CATV architecture is but one of various types of systems that may be utilized to provide recording of network-related content. For example, other systems such as satellite-based television services systems may be utilized for providing interaction between a customer/subscriber and third party content as set out above. Referring now to FIG. 9, digital and analog video programming, information content and interactive television services are provided via a hybrid fiber coax (HFC) network 915 to a television set 901 for consumption by a cable television/services system customer. As is known to those skilled in the art, HFC networks 915 combine both optical fiber and coaxial cable lines. Typically, optical fiber runs from the cable head end 926 to neighborhoods of subscribers. Coaxial cable runs from the optical fiber feeders to each customer or subscriber. The functionality of the HFC network 915 allows for efficient bidirectional data flow between the client-side set-top box 905 and a server-side application server 940 (also referred to as back end application server).

The CATV system 900 is in the form of a distributed client-server computing system for providing video and data flow across the HFC network 915 between server-side services providers (e.g., cable television/services providers) via a server-side head end 926 and a client-side customer via a client-side set-top box (STB) 905 functionally connected to a customer receiving device, such as the television set 901. As is understood by those skilled in the art, modern CATV systems 900 may provide a variety of services across the HFC network 915 including traditional digital and analog video programming, telephone services, high speed Internet access, video-on-demand, and information services.

On the client side of the CATV system 900, digital and analog video programming and digital and analog data are provided to the customer television set 901 via the set-top box (STB) 905. Interactive television services that allow a customer to input data to the CATV system 900 likewise are provided by the STB 905. As illustrated in FIG. 9, the STB 905 is a multipurpose computing device having a computer processor, memory, and an input/output mechanism. The input/output mechanism receives input from server-side processes via the HFC network 915 and from customers via input devices such as the remote control device 928, keyboard 930, or other computing device, such as a tablet/slate computer, smart phone, etc. The remote control device 928 and the keyboard 930 may communicate with the STB 905 via a suitable communication transport such as the infrared connection 932. The STB 905 also includes a video processor for processing and providing digital and analog video signaling to the television set 901 via a cable communication transport 934. A multi-channel tuner is provided for processing video and data to and from the STB 905 and the server-side head end system 926, described below.

The STB 905 also includes an operating system 922 for directing the functions of the STB 905 in conjunction with a variety of client applications 925. For example, if a client application 925 requires a news flash from a third-party news source to be displayed on the television 901, the operating system 922 may cause the graphics functionality and video processor of the STB 905, for example, to output the news flash to the television 901 at the direction of the client application 925 responsible for displaying news items. According to embodiments, the client applications 925 may include one or more applications suitable for coordinating third party content items to the television 901 and for locally storing third party content to a DVR storage capacity at the STB 905 in accordance with embodiments described above.

Because a variety of different operating systems 922 may be utilized by a variety of different brands and types of set-top boxes, a middleware layer 924 may be provided to allow a given software application to be executed by a variety of different operating systems. According to an embodiment, the middleware layer 924 may include a set of application programming interfaces (APIs) that are exposed to client applications 925 and operating systems 922 that allow the client applications to communicate with the operating systems through common data calls understood via the API set. As described below, a corresponding middleware layer is included on the server side of the CATV system 900 for facilitating communication between the server-side application server and the client-side STB 905. The middleware layer 942 of the server-side application server and the middleware layer 924 of the client-side STB 905 may format data passed between the client side and server side according to the Extensible Markup Language (XML).

According to one embodiment, the set-top box 905 passes digital and analog video and data signaling to the television 901 via a one-way communication transport 934. According to other embodiments, two-way communication transports may be utilized, for example, via high definition multimedia (HDMI) ports. The STB 905 may receive video and data from the server side of the CATV system 900 via the HFC network 915 through a video/data downlink and data via a data downlink. The STB 905 may transmit data from the client side of the CATV system 900 to the server side of the CATV system 900 via the HFC network 915 via one data uplink. The video/data downlink is an "in band" downlink that allows for digital and analog video and data signaling from the server side of the CATV system 900 through the HFC network 915 to the set-top box 905 for use by the STB 905 and for distribution to the television set 901. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 9, between the HFC network 915 and the set-top box 905 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 905 and the server-side application server 940 is typically passed through the "out of band" data links. Alternatively, an "in band" data carousel may be positioned in an "in band" channel into which a data feed may be processed from the server-side application server 940 through the HFC network 915 to the client-side STB 905. Operation of data transport between components of the CATV system 900, described with reference to FIG. 9, is well known to those skilled in the art.

Referring still to FIG. 9, the head end (also referred to as the back end) of the CATV system 900 is positioned on the server side of the CATV system and includes hardware and software systems responsible for originating and managing content for distributing through the HFC network 915 to client-side STBs 905 for presentation to customers via televisions 901. As described above, a number of services may be provided by the CATV system 900, including digital and analog video programming, interactive television services, telephone services, video-on-demand services, targeted advertising, and provision of information content.

The application server 940 is a general-purpose computing system operative to assemble and manage data sent to and received from the client-side set-top box 905 via the HFC network 915. As described above with reference to the set-top box 905, the application server 940 includes a middleware layer 942 for processing and preparing data from the head end of the CATV system 900 for receipt and use by the client-side set-top box 905. For example, the application server 940 via the middleware layer 942 may obtain data from third-party services 946 via the Internet 920 for transmitting to a customer through the HFC network 915 and the set-top box 905. For example, content metadata a third-party content provider service may be downloaded by the application server via the Internet 920. When the application server 940 receives the downloaded content metadata, the middleware layer 942 may be utilized to format the content metadata for receipt and use by the set-top box 905. Therefore, content metadata may be sent and categorized based on the availability to the customer's program guide data.

According to one embodiment, data obtained and managed by the middleware layer 942 of the application server 940 is formatted according to the Extensible Markup Language and is passed to the set-top box 905 through the HFC network 915 where the XML-formatted data may be utilized by a client application 925 in concert with the middleware layer 924, as described above. As should be appreciated by those skilled in the art, a variety of third-party services data, including news data, weather data, sports data and other information content may be obtained by the application server 940 via distributed computing environments such as the Internet 920 for provision to customers via the HFC network 915 and the set-top box 905.

According to embodiments, the application server 940 obtains customer support services data, including billing data, information on customer work order status, answers to frequently asked questions, services provider contact information, and the like from data services 960 for provision to the customer via an interactive television session. As illustrated in FIG. 9, the services provider data services 960 include a number of services operated by the services provider of the CATV system 900 which may include data on a given customer.

A billing system 962 may include information such as a customer's name, street address, business identification number, Social Security number, credit history, and information regarding services and products subscribed to by the customer. According to embodiments, the billing system 962 may also include billing data for services and products subscribed to by the customer for bill processing, billing presentment and payment receipt.

A customer information database 968 may include general information about customers such as place of employment, business address, business telephone number, and demographic information such as age, gender, educational level, and the like. The customer information database 968 may also include information on pending work orders for services or products ordered by the customer. The customer information database 968 may also include general customer information such as answers to frequently asked customer questions and contact information for various service provider offices/departments. According to an embodiment, the customer information database 968 may also include profile information for customers/subscribers that include permissions and authentication information associated with or required for accessing and recording third party content as set out above. As should be understood, this information may be stored in a variety of disparate databases operated by the cable services provider.

Referring still to FIG. 9, web services system 950 is illustrated between the application server 940 and the data services 960. According to embodiments, web services system 950 serves as a collection point for data requested from each of the disparate data services systems comprising the data services 960. According to embodiments, when the application server 940 requires customer services data from one or more of the data services 960, the application server 940 passes a data query to the web services system 950. The web services system formulates a data query to each of the available data services systems for obtaining any required data for a requesting customer as identified by a set-top box identification associated with the customer. The web services system 950 serves as an abstraction layer between the various data services systems and the application server 940. That is, the application server 940 is not required to communicate with the disparate data services systems, nor is the application server 940 required to understand the data structures or data types utilized by the disparate data services systems. The web services system 950 is operative to communicate with each of the disparate data services systems for obtaining necessary customer data. The customer data obtained by the web services system is assembled and is returned to the application server 940 for ultimate processing via the middleware layer 942, as described above.

An authentication system 966 may include information such as secure user names, subscriber profiles, subscriber IDs, and passwords utilized by customers for access to network services. As should be understood by those skilled in the art, the disparate systems 962, 964, 966, 968 may be integrated or provided in any combination of separate systems, wherein FIG. 9 shows only one example.

Although described herein in combination with various computing devices, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-9. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for pre-rendering video thumbnails at other than macroblock boundaries, comprising:
    receiving a selection of a video from a plurality of tiles of a mosaic programming guide provided by a service provider, wherein each tile of the mosaic programming guide corresponds with a video program, and wherein the mosaic programming guide permits navigation between the video programs by selecting different tiles;
upon receiving a selection from the plurality of tiles of the mosaic programming guide to display a tile as the currently viewed tile:
retrieving the video, wherein the video is sized to macroblock dimensions;
scaling the video to a scaled dimension other than the macroblock dimensions for displaying in the guide a currently viewed tile of the mosaic programming guide; and
fitting the scaled video within a macroblock, corresponding with the currently viewed tile, that has macroblock dimensions larger than the scaled dimensions of the scaled video; and
as a result of the macroblock corresponding with the currently viewed tile being larger than the scaled dimensions of the scaled video, masking a portion of the macroblock corresponding with the currently viewed tile displayed in the guide that does not include the scaled video in order to display the scaled video as the currently viewed tile within the mosaic programming guide.

2. The method of claim 1, wherein the scaled video is a thumbnail tile displayed within the mosaic programming guide.

3. The method of claim 2, wherein the mosaic programming guide includes a plurality of thumbnail tiles for a plurality of scaled videos.

4. The method of claim 1, further comprising displaying the macroblock including the scaled video.

5. The method of claim 1, further comprising masking the portion of the macroblock that does not include the scaled video with a graphic pane that overlays the macroblock.

6. A method for pre-rendering video thumbnails at other than macroblock boundaries, comprising:
receiving a selection of a video from a plurality of tiles of a mosaic programming guide provided by a service provider, wherein each tile of the mosaic programming guide corresponds with a video program, and wherein the mosaic programming guide permits navigation between the video programs by selecting different tiles;
upon receiving a selection from the plurality of tiles of the mosaic programming guide to display a tile as the currently viewed tile:
retrieving the video, wherein the video is sized to macroblock dimensions;
manipulating the video by scaling the video to a scaled dimension smaller than the macroblock dimensions for displaying in the guide a currently viewed tile;
transcoding the manipulated video to fit the scaled video within a macroblock, corresponding with the currently viewed tile, that has dimensions larger than the scaled dimensions of the scaled video;
transmitting the manipulated video to a client device for display; and
as a result of the macroblock corresponding with the currently viewed tile being larger than the scaled dimensions of the scaled video, masking a portion of the macroblock corresponding with the currently viewed tile displayed in the guide that does not include the scaled video in order to display the scaled video as the currently viewed tile within the mosaic programming guide.

7. The method of claim 6, wherein the scaled video is a thumbnail tile displayed in the mosaic programming guide.

8. The method of claim 7, wherein the mosaic programming guide includes a plurality of thumbnail tiles for a plurality of scaled videos.

9. The method of claim 6, further comprising displaying the macroblock including the scaled video.

10. The method of claim 6, further comprising masking the portion of the macroblock that does not include the scaled video with a graphic pane that overlays the macroblock.

11. A system for pre-rendering video thumbnails at other than macroblock boundaries, comprising:
a processor; and
a memory including computer-readable instructions that when executed by the processor performs the method of:
receiving a selection of a video from a plurality of tiles of a mosaic programming guide provided by a service provider, wherein each tile of the mosaic programming guide corresponds with a video program, and wherein the mosaic programming guide permits navigation between the video programs by selecting different tiles;
upon receiving a selection from the plurality of tiles of the mosaic programming guide to display a tile as the currently viewed tile:
retrieving the video, wherein the video is sized to macroblock dimensions;
manipulating the video by scaling the video to a scaled dimension smaller than the macroblock dimensions for display in the guide as a currently viewed tile;
transcoding the manipulated video to fit the scaled video within a macroblock, corresponding with the currently viewed tile, that has dimensions larger than the scaled dimensions of the scaled video;
transmitting the manipulated video to a client device for display; and
as a result of the macroblock corresponding with the currently viewed tile being larger than the scaled dimensions of the scaled video, masking a portion of the macroblock corresponding with the currently viewed tile displayed in the guide that does not include the scaled video in order to display the scaled video as the currently viewed tile within the mosaic programming guide.

12. The system of claim 11, wherein the scaled video is a thumbnail tile displayed in the mosaic programming guide.

13. The system of claim 12, wherein the mosaic programming guide includes a plurality of thumbnail tiles for a plurality of scaled videos.

14. The system of claim 11, further comprising displaying the macroblock including the scaled video.

15. The system of claim 11, further comprising masking the portion of the macroblock that does not include the scaled video with a graphic pane that overlays the macroblock.

* * * * *